US011717975B1

(12) United States Patent
Receveur et al.

(10) Patent No.: US 11,717,975 B1
(45) Date of Patent: Aug. 8, 2023

(54) CABLE MANAGEMENT SYSTEM FOR A ROBOT SINGULATOR

(71) Applicant: Material Handling Systems, Inc., Mt. Washington, KY (US)

(72) Inventors: Paul Receveur, New Albany, IN (US); Jeremiah Jason Futter, Lanesville, IN (US); Joshua Alan Wiley, Georgetown, IN (US); Kurt Michael Wittmer, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 114 days.

(21) Appl. No.: 17/555,701

(22) Filed: Dec. 20, 2021

Related U.S. Application Data

(60) Provisional application No. 63/128,351, filed on Dec. 21, 2020.

(51) Int. Cl.
*B25J 19/00* (2006.01)
*H02G 3/04* (2006.01)

(52) U.S. Cl.
CPC ........ *B25J 19/0025* (2013.01); *H02G 3/0456* (2013.01)

(58) Field of Classification Search
CPC ............................ B25J 19/0025; H02G 3/0456
See application file for complete search history.

(56) References Cited

U.S. PATENT DOCUMENTS

| 5,878,952 | A | * | 3/1999 | Powell | B25J 19/0075 239/173 |
|---|---|---|---|---|---|
| 10,646,898 | B2 | | 5/2020 | Hillerich, Jr. et al. | |
| 10,994,309 | B2 | | 5/2021 | Hillerich, Jr. et al. | |
| 2012/0186381 | A1 | * | 7/2012 | Robinson | A21C 15/00 414/800 |
| 2020/0262069 | A1 | | 8/2020 | Douglas et al. | |
| 2020/0262070 | A1 | | 8/2020 | Douglas et al. | |
| 2020/0262087 | A1 | | 8/2020 | Douglas et al. | |
| 2021/0221002 | A1 | | 7/2021 | Bader et al. | |

FOREIGN PATENT DOCUMENTS

EP        1598154 A1 * 11/2005   .......... B25J 19/0025

* cited by examiner

*Primary Examiner* — Pete T Lee
(74) *Attorney, Agent, or Firm* — Stites & Harbison, PLLC; David W. Nagle, Jr.; Gary N. Stewart

(57) ABSTRACT

A cable management system for managing one or more cables extending from a robot singulator includes: an upper bracket assembly for mounting the cable management system to a robotic framework of the robot singulator; a cable carrier that is configured to receive and hold the one or more cables in a grouped configuration; and one or more leashes. Each leash of the cable management system is of a predetermined length and includes a distal end that is mounted to the cable carrier and a proximal end that is configured to be mounted to the robotic framework. When mounted to the robotic framework, each leash restricts the lateral movement of the cable carrier and the one or more cables received therein, thus reducing the extent to which the one or more cables can whip about the robotic framework while the robot singulator is in use.

20 Claims, 5 Drawing Sheets

CABLE MANAGEMENT SYSTEM FOR A ROBOT SINGULATOR

CROSS-REFERENCE TO RELATED APPLICATIONS

The present application claims priority to U.S. Patent Application Ser. No. 63/128,351 filed on Dec. 21, 2020, the entire disclosure of which is incorporated herein by reference.

BACKGROUND OF THE INVENTION

The present invention relates to the handling of parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility. One such piece of equipment useful for sorting the various parcels is a robot singulator including a robotic framework (comprised of one or more arms) and an end effector, such as a vacuum-based end effector, that is mounted to the distal end of the robotic framework and configured to engage parcels. In this regard, a number of different robot singulators exist in the art, one of which is disclosed in commonly assigned U.S. Pat. No. 10,646,898 and 10,994,309, which are incorporated herein by reference.

To control certain operations of the robotic framework and/or end effector, it is common for a number of cables (e.g., power supply cables, signal cables, vacuum lines, etc.) to extend from a base of the robotic singulator or some form of source component to the end effector. During operation of the robot singulator, the robotic framework repositions the end effector to engage parcels that are placed on conveyers and transfer the parcels to a target location. In sorting facilities in which a high volume of parcels require sorting, the robotic framework often transports the end effector between a variety of pickup and delivery locations at a rapid rate, sometimes causing the cables extending from the robot singulator to whip about relative to the robotic framework. Such whipping action could potentially injure personnel within the facility and/or damage the robot singulator or other equipment. Although cable carriers are sometimes used to condense the various cables extending from the robot singulator into a single array of cables, such devices do not serve to constrain all movement of the cables, and, indeed, can compound the above-described problem by adding to and condensing the weight of the cables.

Accordingly, there remains a need for improved cable management systems for a robot singulator.

SUMMARY OF THE INVENTION

The present invention is a cable management system for managing one or more cables extending from a robot singulator.

An exemplary cable management system for managing one or more cables extending from a robot singulator includes: an upper bracket assembly for mounting the cable management system to a robotic framework of the robot singulator; a cable carrier that is mounted to the upper bracket assembly and is configured to receive and hold the one or more cables in a grouped configuration; and one or more leashes. Each leash of the cable management system is of a predetermined length and includes a distal end that is mounted to the cable carrier and a proximal end that is configured to be mounted to the robotic framework. When mounted to the robotic framework, each leash of the cable management system restricts the lateral movement of the cable carrier and the one or more cables received therein, thus reducing the extent to which the one or more cables can whip about the robotic framework while the robot singulator is in use.

In some embodiments, the cable management system includes two leashes that are of a predetermined length and are mounted to the robotic framework in a manner that helps maintain the cable carrier and the cables received therein centered in the robotic framework. Preferably, each leash of the cable management system is constructed of a semi-elastic and a semi-flexible material for resiliency against wear over time and to attenuate some of the force imposed on the robotic framework from movement of the cable carrier and the one or more cables received therein.

In some embodiments, the upper bracket assembly includes a mounting ring and a mounting bracket that are configured to be mounted to a base of the robotic framework, where a distal end of the mounting bracket is mounted to another mounting bracket located at the proximal end of the cable carrier.

In some embodiments, the cable management system further includes a lower bracket assembly that is mounted to the distal end of the cable carrier and is configured to receive each of the one or more cables that extend to the end effector of the robot singulator. In one such embodiment, the lower bracket assembly includes: a first plate that is mounted to the distal end of the cable carrier; a second plate that is mounted to the first plate; and one or more fittings mounted to each of the first plate and the second plate, with each fitting configured to receive a cable extending from the robot singulator. Preferably, the first plate and the second plate of the lower bracket assembly are spaced apart from each other as to define a cavity in which a portion of the robotic framework of the robot singulator can be received.

To reduce the strain imposed on the cables, in some embodiments, the proximal end and/or the distal end of the cable carrier includes a mounting bracket for securing the cable carrier to the upper bracket assembly or the lower bracket assembly and that includes teeth to which the one or more cables can be anchored. In some embodiments, both the proximal end and the distal end of the cable carrier include a mounting bracket of such construction. To facilitate organization of the one or more cables within the cable carrier in a desired manner, in some embodiments, the cable carrier defines a plurality of interior cavities in which the one or more cables can be received.

The cable management system can be utilized in combination with a robotic framework, an end effector that is mounted to the robotic framework, and one or more cables that is operably connected to at least one of the robotic framework and the end effector to provide a robot singulator with improved cable management.

DETAILED DESCRIPTION OF THE INVENTION

The present invention is a cable management system for managing one or more cables extending from a robot singulator.

Figure 1:
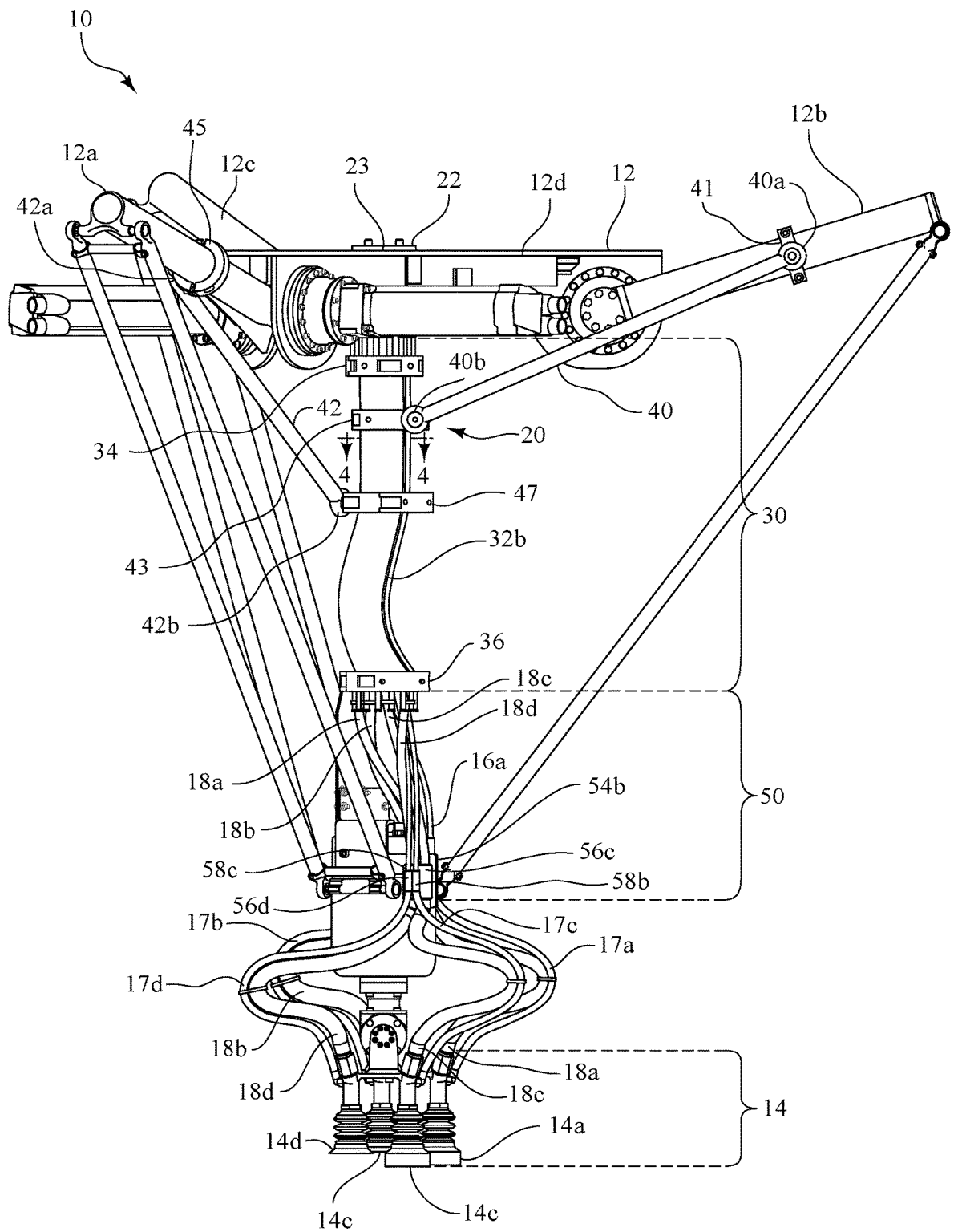
FIG. 1 is a perspective view of a robot singulator, including an exemplary cable management system made in accordance with the present invention.

FIG. 1 is a perspective view of a robot singulator 10, including an exemplary cable management system 20 made in accordance with the present invention.

Figure 4:
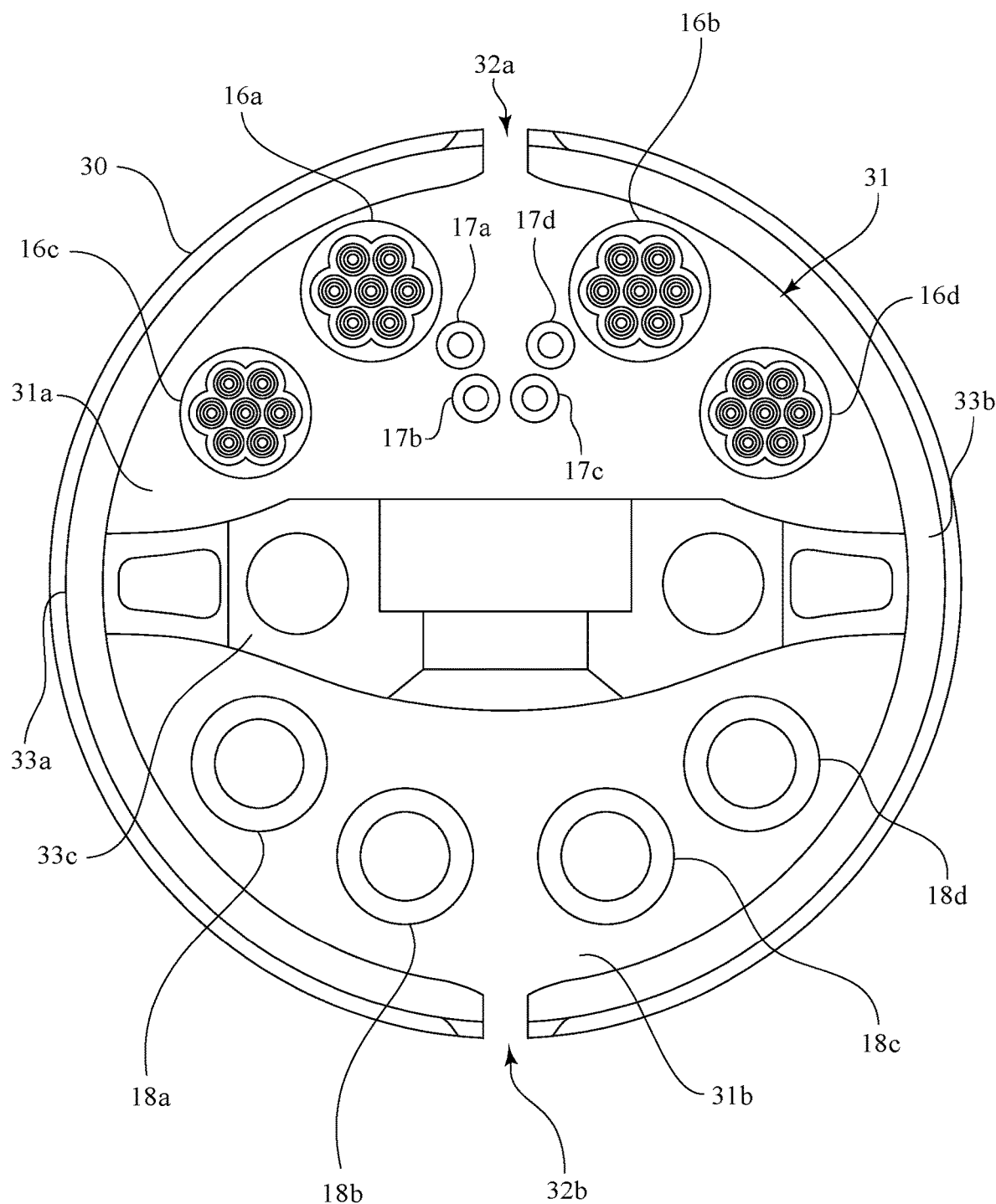
FIG. 4 is a sectional view of a cable carrier of the exemplary cable management system taken along line 4-4 of FIG. 1.
Figure 5:
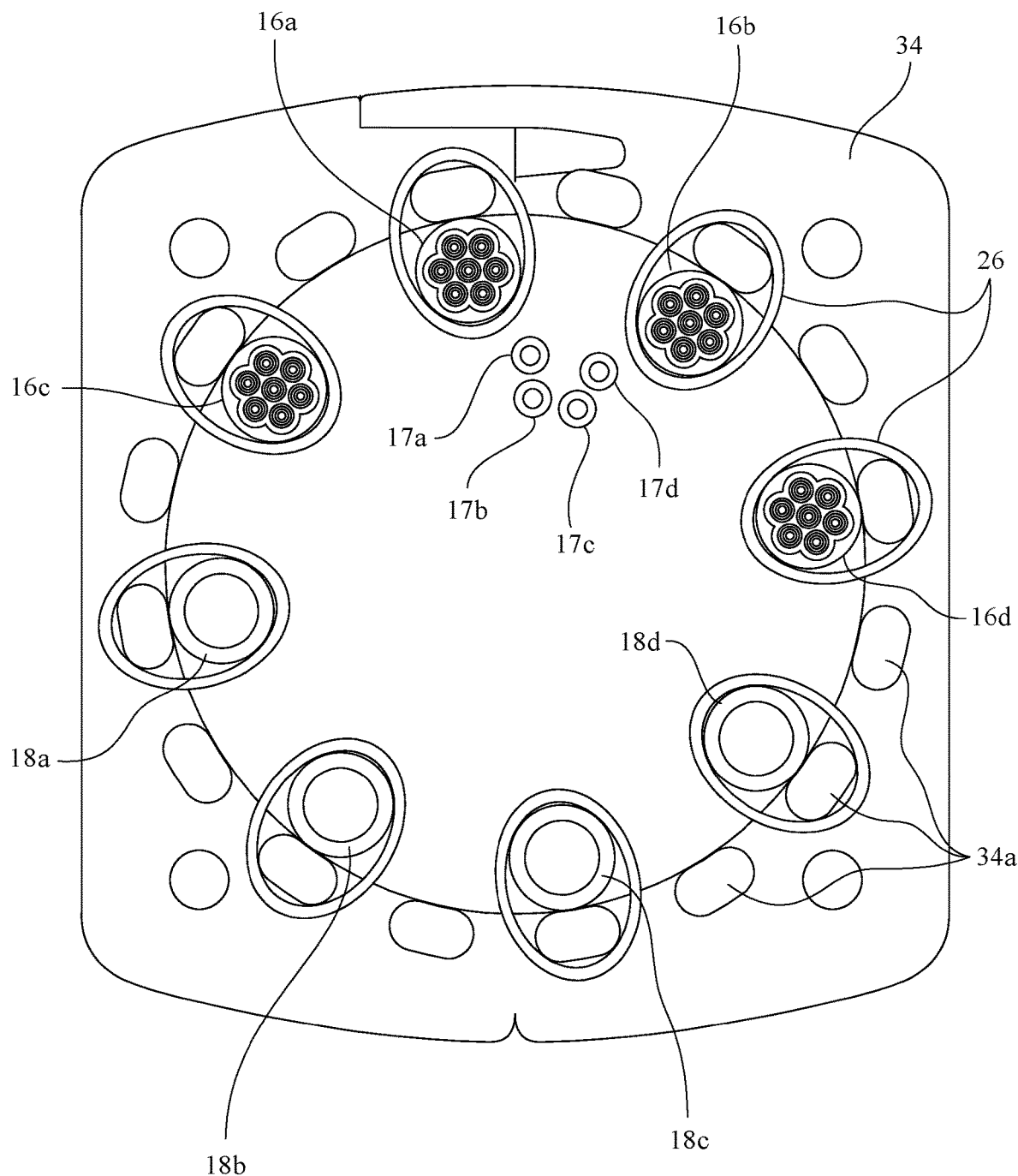
FIG. 5 is a partial top view of the cable carrier of the exemplary cable management system of FIG. 1.

As shown in FIG. 1, the robot singulator 10 includes: a robotic framework 12; an end effector 14 for engaging parcels mounted to a distal end of the robotic framework 12; one or more cables; and the exemplary cable management system 20. In the exemplary embodiment shown in FIG. 1, there are twelve cables 16a, 16b, 16c, 16d, 17a, 17b, 17c, 17d, 18a, 18b, 18c, 18d (of which nine are shown in FIG. 1 and all of which are shown in FIGS. 4 and 5) that extend from the robotic framework 12 and/or end effector 14 and are operably connected to various source components (e.g., a power source, a signal source, vacuum source), as further described below. In use, the cable management system 20 receives the cables 16a, 16b, 16c, 16d, 17a, 17b, 17c, 17d, 18a, 18b, 18c, 18d and is mounted to the robotic framework 12 in a manner which restricts lateral movement of the cables 16a, 16b, 16c, 16d, 17a, 17b, 17c, 17d, 18a, 18b, 18c, 18d during operation of the robot singulator 10, as further described below.

Referring still to FIG. 1, in this exemplary embodiment, the end effector 14 of the robot singulator 10 is a vacuum-based end effector with multiple vacuum cups 14a, 14b, 14c, 14d for engaging and transferring parcels. Specifically, the end effector 14 has four vacuum cups: a first vacuum cup 14a; a second vacuum cup 14b; a third vacuum cup 14c; and a fourth vacuum cup 14d. It should be appreciated, however, that end effectors of alternative construction may be utilized without departing from the spirit or scope of the present invention. For instance, suitable end effectors which may be utilized in the present invention include, but are not necessarily limited to, those described in co-pending and commonly assigned: U.S. patent application Ser. No. 16/793,058 (published as U.S. Patent Application Publication No. 2020/0262087); U.S. patent application Ser. No. 16/793,902 (published as U.S. Patent Application Publication No. 2020/0262069); U.S. patent application Ser. No. 16/794,516 (published as U.S. Patent Application Publication No. 2020/0262070); and U.S. patent application Ser. No. 17/118,777 (published as U.S. Patent Application Publication No. 2021/0221002), each of which are incorporated herein by reference. In this exemplary embodiment, the robotic framework 12 includes a first arm 12a, a second arm 12b, and a third arm 12c that can be selectively activated to move the end effector 14. The robotic framework 12 thus provides multiple degrees of freedom so that the robotic framework 12 can be positioned in a manner which enables the end effector 14 to engage a selected parcel.

For example, one suitable robot singulator for use in the present invention is a Delta 3 P6 robot manufactured by Schneider Electric and available, for instance, from Advantage industrial Automation of Duluth, Ga., with a vacuum-based end effector mounted thereto.

In some embodiments, movement of the respective components of the robotic framework 12, actuation of the end effector 14, and/or activation of source components to which the robot singulator 10 is operably connected via the cables 16a, 16b, 16c, 16d, 17a, 17b, 17c, 17d, 18a, 18b, 18c, 18d may be regulated by a control subsystem (not shown), such as that disclosed in commonly assigned: U.S. patent application Ser. No. 16/793,902 (published as U.S. Patent Application Publication No. 2020/0262069); U.S. patent application Ser. No. 16/794,516 (published as U.S. Patent Application Publication No. 2020/0262070); U.S. patent application Ser. No. 17/118,777 (published as U.S. Patent Application Publication No. 2021/0221002); and U.S. Pat. No. 10,646,898, all of which are incorporated herein by reference.

FIG. 4 is a sectional view of a cable carrier 30 of the cable management system 20 with the cables 16a, 16b, 16c, 16d, 17a, 17b, 17c, 17d, 18a, 18b, 18c, 18d of the robot singulator 10 received therein.

Referring now to FIGS. 1 and 4, in this exemplary embodiment, the cables 16a, 16b, 16c, 16d, 17a, 17b, 17c, 17d, 18a, 18b, 18c, 18d of the robot singulator 10 include three different sets of cables: a set of electrical cables 16a, 16b, 16c, 16d; a set of vacuum lines 18a, 18b, 18c, 18d; and a set of vacuum sensor lines 17a, 17b, 17c, 17d. Specifically, the set of electrical cables 16a, 16b, 16c, 16d includes: two power cables 16a, 16b operably connected to a power source (not shown) and two encoder cables 16c, 16d operably connected to a controller of a control subsystem (not shown). The number of vacuum lines 18a, 18b, 18c, 18d corresponds to the number of vacuum cups 14a, 14b, 14c, 14d of the end effector 14. Accordingly, in this exemplary embodiment, there are four vacuum lines 18a, 18b, 18c, 18d, with each vacuum line 18a, 18b, 18c, 18d corresponding to and in fluid communication with one of the vacuum cups 14a, 14b, 14c, 14d of the end effector 14. The number of vacuum sensor lines 17a, 17b, 17c, 17d corresponds to the number of vacuum lines 18a, 18b, 18c, 18d. Accordingly, in this exemplary embodiment, there are four vacuum sensor lines 17a, 17b, 17c, 17d, with each vacuum sensor line 17a, 17b, 17c, 17d also corresponding to and in fluid communication with one of the vacuum cups 14a, 14b, 14c, 14d and a vacuum sensor (not shown). Of course, as noted above, end effectors other than that described above may be utilized in the robot singulator 10. Thus, the number and type of cables utilized in the robot singulator 10 can vary to accommodate such alternative end effectors and/or different sorting environments or applications without affecting the ability of the cable management system 20 to function in the manner described herein.

Figure 2:
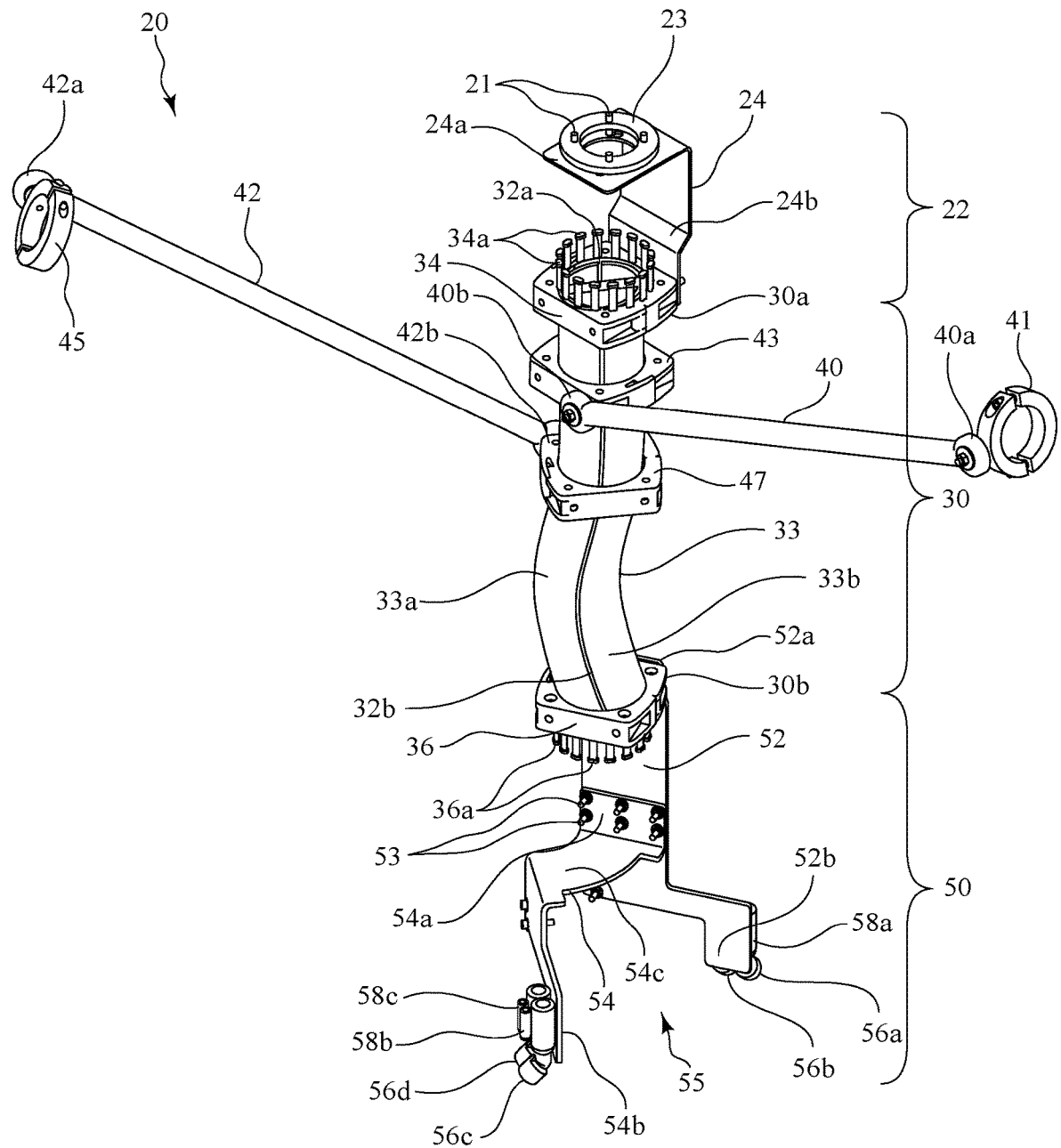
FIG. 2 is a perspective view of the exemplary cable management system of FIG. 1.
Figure 3:
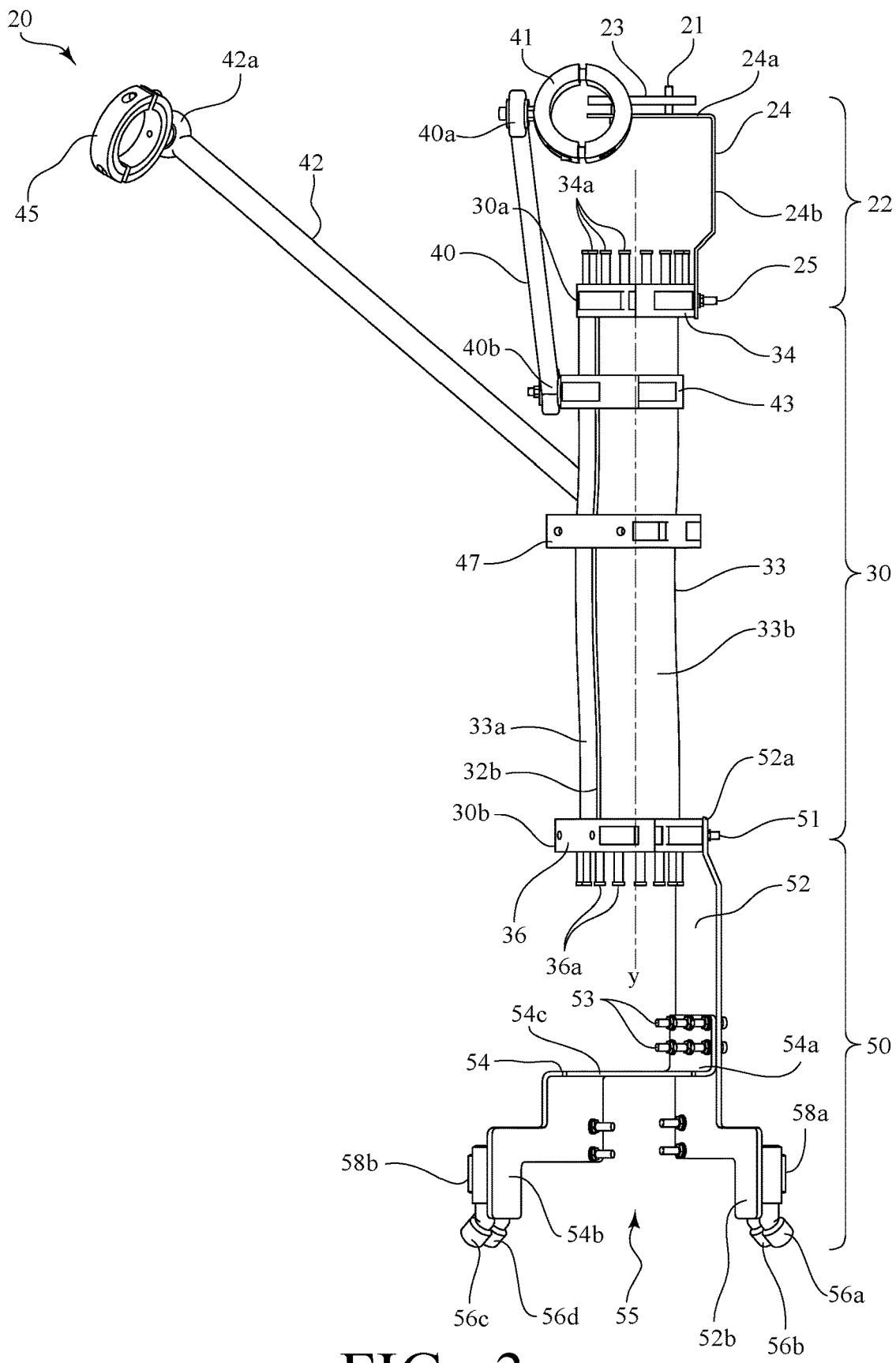
FIG. 3 is another perspective view of the exemplary cable management system of FIG. 1.

FIGS. 2 and 3 are perspective views of the cable management system 20.

FIG. 5 is a top view of the cable carrier 30 of the cable management system 20 with the cables 16a, 16b, 16c, 16d, 17a, 17b, 17c, 17d, 18a, 18b, 18c, 18d of the robot singulator 10 received therein.

Referring now to FIGS. 1-5, the exemplary cable management system 20 includes: an upper bracket assembly 22; a cable carrier 30; and one or more leashes 40, 42. The upper bracket assembly 22 is configured to be mounted to the robotic framework 12 to maintain the cable management system 20 in association with the robotic framework 12 while the robot singulator 10 is in use. The cable carrier 30 is configured to receive and hold the respective cables 16a, 16b, 16c, 16d, 17a, 17b, 17c, 17d, 18a, 18b, 18c, 18d of the robot singulator 10 in a grouped configuration around a common, longitudinal axis, y (indicated in dashed lines in FIG. 3). Each leash of the one or more leashes 40, 42 is of a predetermined length and includes a proximal end 40a, 42a that is mounted to an arm of the robotic framework 12 and a distal end 40b, 42b that is mounted to the cable carrier 30, thus limiting the distance that the cables 16a, 16b, 16c, 16d, 17a, 17b, 17c, 17d, 18a, 18b, 18c, 18d at the point where the leash is mounted can travel away from the arm of the robotic framework 12 to which it is mounted, as further described below.

Referring now specifically to FIGS. 1-3, in this exemplary embodiment, the upper bracket assembly 22 includes a mounting ring 23 and a mounting bracket 24. The mounting ring 23 and the mounting bracket 24 are positioned on a first (upper) surface of a base 12d of the robotic framework 12 and a second (lower) surface of the base 12d, respectively, and are secured together using fasteners 21 (e.g., nut and bolt combinations), which pass through a series of corresponding openings defined by the mounting ring 23, the base 12d of the robotic framework 12, and the mounting bracket 24. To permit the cables 16a, 16b, 16c, 16d, 17a, 17b, 17c, 17d, 18a, 18b, 18c, 18d of the robot singulator 10 to pass upwardly through the robotic framework 12 for connection to a source component and/or sensor component, the mounting ring 23, base 12d of the robotic framework 12, and mounting bracket 24 also define a central opening through which the cables 16a, 16b, 16c, 16d, 17a, 17b, 17c, 17d, 18a, 18b, 18c, 18d can pass. To provide spacing between the base 12d of the robotic framework 12 and a proximal end 30a of the cable carrier 30, the importance of which is further described below, the mounting bracket 24, in this exemplary embodiment, is L-shaped and includes: a first (or lateral) plate 24a, which is mounted to the base 12d of the robotic framework 12 and defines the opening of the mounting bracket 24 through which the cables 16a, 16b, 16c, 16d, 17a, 17b, 17c, 17d, 18a, 18b, 18c, 18d can pass; and a second (or longitudinal) plate 24b that extends perpendicularly to the first plate 24a and to which the proximal end 30a of the cable carrier 30 is mounted. In this exemplary embodiment, the lateral plate 24a and the longitudinal plate 24b are integrally formed, such that the mounting bracket 24 is of a unitary construction (i.e., a single component). Of course, the lateral plate 24a and longitudinal plate 24b could alternatively be two separate components which are secured together to form the mounting bracket 24 without departing from the spirit and scope of the present invention.

Referring now again to FIGS. 1-5, the cable carrier 30 defines a substantially hollow interior cavity 31 (FIG. 4) in which the cables 16a, 16b, 16c, 16d, 17a, 17b, 17c, 17d, 18a, 18b, 18c, 18d of the robotic singulator 10 are received and has an open proximal end 30a and an open distal end 30b, such that the cables 16a, 16b, 16c, 16d, 17a, 17b, 17c, 17d, 18a, 18b, 18c, 18d can extend entirely through the cable carrier 30 and connect to a distal end of the robotic framework 12 and/or the end effector 14. To maintain the portion of the cables 16a, 16b, 16c, 16d, 17a, 17b, 17c, 17d, 18a, 18b, 18c, 18d extending between the base 12d of the robotic framework 12 and a distal end of the robotic framework 12 and/or the end effector 14 in a grouped configuration around the common axis, y, the cable carrier 30 preferably spans at least half of the length existing between the base 12d of the robotic framework 12 and a distal end of the robotic framework 12, as shown in FIG. 1. In this exemplary embodiment, the cable carrier 30 also defines one or more longitudinal channels 32a, 32b and is constructed of a flexible material (e.g., a plastic polymer), so that the cable carrier 30 can be manipulated (flexed or bent) to insert or remove a cable from the interior cavity 31 from the side of the cable carrier 30. In this regard, the longitudinal channels 32a, 32b of the cable carrier 30 thus enable access to the portion of the cables 16a, 16b, 16c, 16d, 17a, 17b, 17c, 17d, 18a, 18b, 18c, 18d which is normally housed within the cable carrier 30, without having to completely remove the cables 16a, 16b, 16c, 16d, 17a, 17b, 17c, 17d, 18a, 18b, 18c, 18d from the cable carrier 30.

Referring now specifically to FIGS. 2 and 4, in this exemplary embodiment, there are two longitudinal channels 32a, 32b that are defined by a circumferential wall 33 of the cable carrier 30, which in this case, is defined by a first semi-cylindrical wall 33a and a second semi-cylindrical wall 33b that are interconnected by one or more intermediate connectors 33c (FIG. 4). The intermediate connector(s) 33c of the cable carrier 30 divides the interior cavity 31 of the cable carrier 30 into multiple cavities in which the cables 16a, 16b, 16c, 16d, 17a, 17b, 17c, 17d, 18a, 18b, 18c, 18d of the robot singulator 10 can be organized in a desired manner. Specifically, in this exemplary embodiment, the intermediate connector(s) 33c divide the interior cavity 31 into: a first cavity 31a, in which a first grouping of cables can be received, which, in this implementation, are cables 16a, 16b, 16d, 17a, 17b, 17c, 17d; and a second cavity 31b in which a second grouping of cables can be received, which, in this implementation, are cables 18a, 18b, 18c, 18d.

Referring now again specifically to FIG. 1, in this exemplary embodiment, the first semi-cylindrical wall 33a and the second semi-cylindrical wall 33b are both of a continuous construction, such that the portion of the cables 16a, 16b, 16d, 17a, 17b, 17c, 17d, 18a, 18b, 18c, 18d received in the cable carrier 30 is not visible outside of the cable carrier 30. Alternative cable carrier constructions are, however, contemplated and can be utilized without departing from the spirit and scope of the present invention. For example, in alternative embodiments, the cable carrier 30 may be a cable carrier selected from the TRIFLEX R series manufactured by Igus, Inc. of Cologne, Germany.

Referring now to FIGS. 2, 3, and 5, the proximal end 30a of the cable carrier 30 includes a first mounting bracket 34 that is mounted to the second plate 24b of the mounting bracket 24 of the upper bracket assembly 22 using one or more fasteners 25 (e.g., nut and bolt combination). As shown, in this implementation, the first mounting bracket 34 is mounted to the second plate 24b of the mounting bracket 24, such that the open proximal end 30a of the cable carrier 30 is substantially aligned with the series of corresponding openings defined by the mounting ring 23, the base 12d of the robotic framework 12, and the first plate 24a of the mounting bracket 24. In this exemplary embodiment, the first mounting bracket 34 also includes teeth 34a which, in use, extend upwardly toward the base 12d of the robotic framework 12, and to which the respective cables 16a, 16b, 16c, 16d, 17a, 17b, 17c, 17d, 18a, 18b, 18c, 18d can be anchored with fasteners 26 (e.g., cable ties) to reduce the strain imposed on the cables 16a, 16b, 16c, 16d, 17a, 17b, 17c, 17d, 18a, 18b, 18c, 18d, as shown best in FIG. 5. As shown in FIGS. 2 and 3, the spacing between the base 12d of the robotic framework 12 and the proximal end 30a of the cable carrier 30 created by virtue of the second plate 24b extending downwardly from the first plate 24a of the mounting bracket 24 enables a user to readily access the teeth 34a of the first mounting bracket 34 and thus anchor the cables 16a, 16b, 16c, 16d, 17a, 17b, 17c, 17d, 18a, 18b, 18c, 18d thereto.

Referring now specifically to FIGS. 2 and 3, the distal end 30b of the cable carrier 30 includes a second mounting bracket 36, which, in this exemplary embodiment, is mounted to a lower bracket assembly 50, as further described below. The second mounting bracket 36 is of identical construction and functions in the same manner as the first mounting bracket 34 described above, except that the teeth 36a of the second mounting bracket 36 extend downwardly toward the end effector 14, instead of upwardly toward the base 12d of the robotic framework 12. For example, one suitable bracket which may be utilized for the first mounting bracket 34 and the second mounting bracket 36 is the TRIFLEX R Light Mounting Bracket with Short Strain Relief manufactured by Igus, Inc. of Cologne, Germany. It is appreciated, however, that, in alternative embodiments, alternative brackets or securing means may be utilized for mounting the cable carrier 30 to the upper bracket assembly 22 and the lower bracket assembly 50.

Referring now again to FIGS. 1-3, in this exemplary embodiment, the cable management system 20 includes two leashes 40, 42: a first leash 40 and a second leash 42. The first leash 40 has a proximal end 40a that is mounted to one of the arms of the robotic framework 12, which, in this implementation, is the second arm 12b, and a distal end 40b which is mounted at a first position along the length of the cable carrier 30. In use, the first leash 40 limits the distance that the cable carrier 30, and thus cables 16a, 16b, 16c, 16d, 17a, 17b, 17c, 17d, 18a, 18b, 18c, 18d received therein, at the point where the first leash 40 is mounted can travel away from the second arm 12b of the robotic framework 12 during operation of the robot singulator 10. In this regard, the first leash 40 effectively imposes a first set of outer bounds on the cable carrier 30 with respect to its potential movement away from the second arm 12b of the robotic framework 12, and thus the lateral movement of the cables 16a, 16b, 16c, 16d, 17a, 17b, 17c, 17d, 18a, 18b, 18c, 18d received therein.

Referring still to FIGS. 1-3, the second leash 42 similarly has a proximal end 42a that is mounted to another arm of the robotic framework 12 (i.e., a different arm than the first leash 40), which, in this implementation, is the first arm 12a, and a distal end 42b which is mounted at a second position along the length of the cable carrier 30. Similar to the first leash 40, in use, the second leash 42 also limits the distance that the cable carrier 30, and thus cables 16a, 16b, 16c, 16d, 17a, 17b, 17c, 17d, 18a, 18b, 18c, 18d received therein, at the point where the second leash 42 is mounted can travel away from the first arm 12a of the robotic framework 12. In this regard, the second leash 42 effectively imposes a second set of outer bounds on the cable carrier 30 with respect to its potential movement away from the first arm 12a of the robotic framework 12, and thus further restricts the lateral movement of the cables 16a, 16b, 16c, 16d, 17a, 17b, 17c, 17d, 18a, 18b, 18c, 18d received therein.

Referring still to FIGS. 1-3, the first leash 40 is preferably constructed of either a semi-elastic or non-elastic material, such that the distance the cable carrier 30 at the point of attachment to the distal end 40b of the first leash 40 can travel away from the second arm 12b of the robotic framework 12 corresponds approximately to the length of the first leash 40. Similarly, the second leash 42 is also preferably constructed of either a semi-elastic or non-elastic material, such that the distance the cable carrier 30 at the point of attachment to the distal end 42b of the second leash 42 can travel away from the first arm 12a of the robotic framework 12 corresponds approximately to the length of the second leash 42. For improved resiliency to wear over time, and to attenuate some of the force imposed on the first arm 12a and the second arm 12b of the robotic framework 12 from movement of the cable carrier 30 and cables 16a, 16b, 16c, 16d, 17a, 17b, 17c, 17d, 18a, 18b, 18c, 18d, in this exemplary embodiment, the first leash 40 and the second leash 42 are constructed of a semi-elastic and semi-flexible rubber cable, similar to a bungee cord. Alternative embodiments are, however, contemplated in which the first leash 40 and/or the second leash 42 are constructed of a non-elastic or more rigid material.

Referring still to FIGS. 1-3, the length of the first leash 40 and the second leash 42 and the position at which the first leash 40 and the second leash 42 are mounted to the robotic framework 12 can be adjusted to restrict the outer bounds imposed thereby and thus the lateral movement of the cable carrier 30 and the cables 16a, 16b, 16c, 16d, 17a, 17b, 17c, 17d, 18a, 18b, 18c, 18d as desired. In this exemplary embodiment, the first leash 40 and the second leash 42 are each of a predetermined length and are mounted at a position along the second arm 12b and the first arm 12a of the robotic framework 12, respectively, so that the first leash 40 and the second leash 42 are substantially taut when the cable carrier 30 is centered in the robotic framework 12 (i.e., when the cable carrier 30 is positioned in an area central to each arm 12a, 12b, 12c of the robotic framework 12). Specifically, in this exemplary embodiment, the first leash 40 and the second leash 42 are, respectively, mounted approximately six inches from a joint of the second arm 12b and the first arm 12a of the robotic framework 12 (FIG. 1). Of course, the length and/or the location at which the proximal end 40a, 42a is mounted along the second arm 12b and the first arm 12a, respectively, of the robotic framework 12 can be adjusted as desired to increase or decrease the degree of slack in the first leash 40 and the second leash 42.

Referring now again specifically to FIG. 1, the arms of the robotic framework 12 to which the first leash 40 and the second leash 42 are mounted are spaced apart from each other, such that the first set of outer bounds imposed on the cable carrier 30 and cables 16a, 16b, 16c, 16d, 17a, 17b, 17c, 17d, 18a, 18b, 18c, 18d received therein by the first leash 40 significantly limits the extent to which the cable carrier 30 at the point where the first leash 40 is mounted can travel toward the first arm 12a of the robotic framework 12 to which the second leash 42 is mounted. As a result of such spacing, the second set of outer bounds imposed on the cable carrier 30 and the cables 16a, 16b, 16c, 16d, 17a, 17b, 17c, 17d, 18a, 18b, 18c, 18d received therein by the second leash 42 also significantly limits the extent to which the cable carrier 30 at the point where the second leash 42 is mounted can travel toward the second arm 12b of the robotic framework 12 to which the first leash 40 is mounted. In this exemplary embodiment, the arms 12a, 12b, 12c of the robotic framework 12 are spaced apart from each other by approximately 120°. In conjunction, the first and second set of bounds imposed by the first leash 40 and the second leash 42, respectively, helps to maintain the cable carrier 30 and the cables 16a, 16b, 16c, 16d, 17a, 17b, 17c, 17d, 18a, 18b, 18c, 18d centered in the robotic framework 12 when the robot singulator 10 is in use.

Referring now again to FIGS. 1-3, in this exemplary embodiment, the proximal end 40a of the first leash 40 is indirectly mounted to the second arm 12b of the robotic framework 12 by a third mounting bracket 41, and the proximal end 42a of the second leash 42 is indirectly mounted to the first arm 12a of the robotic framework 12 by a fourth mounting bracket 45. Specifically, in this embodiment, the third mounting bracket 41 and the fourth mounting bracket 45a are each in the form of a ring, comprising two semicircular portions that can be positioned around the second arm 12b and then joined together by one or more fasteners. Of course, alternative bracket types or means of securing the proximal end 40a, 42a of the first leash 40 and the second leash 42 to the robotic framework 12 may be utilized without departing from the spirit or scope of the present invention. Indeed, alternative implementations are contemplated in which the proximal end 40a, 42a of the first leash 40 and the second leash 42 are mounted directly to the robotic framework 12.

Referring still to FIGS. 1-3, in this exemplary embodiment, the distal end 40b, 42b of the first leash 40 and the second leash 42 are indirectly mounted to the cable carrier 30 by brackets. Specifically, the distal end 40b of the first leash 40 is mounted to the cable carrier 30 via a fifth mounting bracket 43, and the distal end 42b of the second leash 42 is mounted to the cable carrier 30 via a sixth mounting bracket 47, which, in this implementation, is positioned below the fifth mounting bracket 43. In this exemplary embodiment, the fifth mounting bracket 43 and the sixth mounting bracket 47 are of the same general construction as the first mounting bracket 34 and the second mounting bracket 36, except that the fifth mounting bracket 43 and the sixth mounting bracket 47 do not include teeth. Of course, alternative bracket types or means of securing the distal end 40b, 42b of the first leash 40 and the second leash 42 to the cable carrier 30 may be utilized in the present invention without departing from the spirit or scope of the present invention. Indeed, alternative implementations are contemplated in which the distal end 40b, 42b of the first leash 40 and the second leash 42 are mounted directly to the cable carrier 30.

Referring still to FIGS. 1-3, as a further refinement, in this exemplary embodiment, the cable management system 20 further includes a lower bracket assembly 50 that is configured to receive each of the one or more of the cables 16a, 16b, 16c, 16d, 17a, 17b, 17c, 17d, 18a, 18b, 18c, 18d that extend beyond the distal end of the robotic framework 12 when the robot singulator 10 is in use. As shown in FIG. 1, in this implementation, the set of vacuum lines 18a, 18b, 18c, 18d and the set of vacuum sensor lines 17a, 17b, 17c, 17d extend beyond the distal end of the robotic framework 12 and are received by the lower bracket assembly 50, as further described below.

Referring still to FIGS. 1-3, the lower bracket assembly 50 includes a first plate 52 with a proximal end 52a mounted to the second mounting bracket 36 of the cable carrier 30 via one or more fasteners 51 (e.g., nut and bolt combinations) and a second plate 54 with a proximal end 54a that is mounted to the first plate 52, also using one or more fasteners 53 (e.g., nut and bolt combinations). As shown, in this exemplary embodiment, the first plate 52 extends downwardly from the second mounting bracket 36. As perhaps shown best in FIG. 3, in this exemplary embodiment, the second plate 54 defines, and thus can be characterized as including: the proximal end 54a, which is longitudinally oriented and abuts the first plate 52; a mid-portion 54c, which is perpendicular to and extends away from the proximal end 54a; and a distal end 54b, which extends downwardly from the mid-portion 54c. In this exemplary embodiment, the distal end 52b of the first plate 52 and the distal end 54b of the second plate 54 of the lower bracket assembly 50 are oriented relative to each other as to define a cavity 55 for receiving a portion of the robotic framework 12, such as a portion (which also may be characterized as an arm) of the robotic framework 12 that is positioned between the distal end of arms 12a, 12b, 12c and is configured to move the end effector 14 to selectively engage parcels, while the robot singulator 10 is in use. Further, in this embodiment, the mid-portion 54c of the second plate 54 is slightly curved to accommodate an arm of the robotic framework 12. As a result of the foregoing construction, a portion of the cables 16a, 16b, 16c, 16d, 17a, 17b, 17c, 17d, 18a, 18b, 18c, 18d extending below the distal end 30b of the cable carrier 30 can be readily accessed and anchored to the teeth 36a of the second mounting bracket 36 with fasteners (not shown) to further reduce the strain imposed on the cables 16a, 16b, 16c, 16d, 17a, 17b, 17c, 17d, 18a, 18b, 18c, 18d. In some implementations, the lower bracket assembly 50 may also be mounted to a distal end of the robotic framework via one or more fasteners (e.g., nut and bolt combinations).

Referring still to FIGS. 1-3, in this exemplary embodiment, the distal end 52b of the first plate 52 and the distal end 54b of the second plate 54 of the lower bracket assembly 50 have one or more fittings mounted thereto. Specifically, in this exemplary embodiment, the distal end 52b of the first plate 52 and the distal end 54b of the second plate 54 have a first pair of vacuum line fittings 56a, 56b and a second pair of vacuum line fittings 56c, 56d, respectively, mounted thereto. Each vacuum line fitting 56a, 56b, 56c, 56d is configured to receive one of the vacuum lines 18a, 18b, 18c, 18d, which extend to the end effector 14. In this exemplary embodiment, each vacuum line 18a, 18b, 18c, 18d is actually comprised of two separate hoses: a first hose with a distal end in fluid communication with an inlet of one of the vacuum line fittings 56a, 56b, 56c, 56d; and a second hose with a proximal end in fluid communication with an outlet of one of the vacuum line fittings 56a, 56b, 56c, 56d and a distal end in fluid communication with one of the vacuum cups 14a, 14b, 14c, 14d of the end effector 14. The vacuum lines 18a, 18b, 18c, 18d and vacuum line fittings 56a, 56b, 56c, 56d may, however, be alternatively constructed such that each vacuum line 18a, 18b, 18c, 18d is comprised of a single hose that extends entirely through one of the vacuum line fittings 56a, 56b, 56c, 56d and has a distal end that is in fluid communication with one of the vacuum cups 14a, 14b, 14c, 14d of the end effector 14 without departing from the spirit or scope of the present invention.

Referring still to FIGS. 1-3, in this exemplary embodiment, the distal end 52b of the first plate 52 and the distal end 54b of the second plate 54 also have a first pair of vacuum sensor fittings 58a (one of which is shown in FIG. 3) and a second pair of vacuum sensor fitting 58b, 58c, respectively, mounted thereto. Each vacuum sensor fitting 58a, 58b, 58c is configured to receive one of the vacuum sensor lines 17a, 17b, 17c, 17d, which extend to the end effector 14. In this exemplary embodiment, each vacuum sensor line 17a, 17b, 17c, 17d is actually comprised of two separate hoses: a first hose with a distal end in fluid communication with an inlet of one of the vacuum sensor fittings 58a, 58b, 56c; and a second hose with a proximal end in fluid communication with an outlet of one of the vacuum sensor fittings 58a, 58b, 58c and a distal end in fluid communication with one of the vacuum cups 14a, 14b, 14c, 14d of the end effector 14. The vacuum sensor lines 17a, 17b, 17c, 17d and vacuum sensor fittings 58a, 58b, 58c may, however, be alternatively constructed such that each vacuum sensor line 17a, 17b, 17c, 17d is comprised of a single hose which extends entirely through one of the vacuum sensor fittings 58a, 58b, 58c and has a distal end that is in fluid communication with one of the vacuum cups 14a, 14b, 14c, 14d of the end effector 14 without departing from the spirit or scope of the present invention.

Although described primarily in the context of the robot singulator 10 illustrated in FIG. 1, it should be appreciated that the utility of the cable management system 20 of the present application is not necessarily limited to robot singulators of such construction. Accordingly, it should be appreciated that the cable management system 20 of the present invention can be utilized with a variety of different or alternatively constructed robot singulators without departing from the spirit and scope of the present invention. Furthermore, while the cable management system 20 is primarily described herein as including two leashes, alternative embodiments in which only a single leash is used, as well alternative embodiments in which more than two leashes are utilized are also contemplated. For example, in one alternative embodiment, the cable management system 20 may include a third leash which is mounted to the third arm 12*c* of the robotic framework 12 and the cable carrier 30 to further restrict lateral movement of the cable carrier 30 and the cables 16*a*, 16*b*, 16*c*, 16*d*, 17*a*, 17*b*, 17*c*, 17*d*, 18*a*, 18*b*, 18*c*, 18*d* received therein while the robot singulator 10 is in use.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A cable management system for managing one or more cables extending from a robot singulator including a robotic framework and an end effector, comprising:
   an upper bracket assembly for mounting the cable management system to the robotic framework;
   a cable carrier mounted to the upper bracket assembly and configured to receive and hold the one or more cables in a grouped configuration; and
   one or more leashes of a predetermined length for restricting lateral movement of the cable carrier, with each leash of the one or more leashes including a distal end that is mounted to the cable carrier and a proximal end that is configured to be mounted to the robotic framework.

2. The cable management system as recited in claim 1, and further comprising:
   a lower bracket assembly mounted to a distal end of the cable carrier and configured to receive each of the one or more cables that extend beyond a distal end of the robotic framework.

3. The cable management system as recited in claim 2, wherein the lower bracket assembly includes:
   a first plate mounted to the distal end of the cable carrier;
   a second plate mounted to the first plate; and
   one or more fittings mounted to each of the first plate and the second plate, each fitting of the one or more fittings configured to receive one of the one or more cables extending to the end effector of the robot singulator.

4. The cable management system as recited in claim 3, wherein the first plate and the second plate of the lower bracket assembly define a cavity for receiving a portion of the robotic framework.

5. The cable management system as recited in claim 2, wherein at least one of a proximal end of the cable carrier and the distal end of the cable carrier includes a mounting bracket for securing the cable carrier to the upper bracket assembly or the lower bracket assembly, the mounting bracket including teeth to which the one or more cables can be anchored.

6. The cable management system as recited in claim 1, wherein the cable carrier defines a plurality of interior cavities for receiving the one or more cables.

7. The cable management system as recited in claim 1, wherein the one or more leashes includes:
   a first leash with a proximal end mounted to a first arm of the robotic framework and a distal end mounted to the cable carrier; and
   a second leash with a proximal end mounted to a second arm of the robotic framework and a distal end mounted to the cable carrier below the distal end of the first leash.

8. The cable management system as recited in claim 1, wherein each leash of the one or more leashes is constructed of a semi-elastic and semi-flexible material.

9. A cable management system for managing one or more cables extending from a robot singulator including a robotic framework and an end effector, comprising:
   an upper bracket assembly for mounting the cable management system to the robotic framework;
   a cable carrier having a proximal end mounted to the upper bracket assembly and configured to receive and hold the one or more cables in a grouped configuration;
   a first leash with a proximal end configured to be mounted to a first arm of the robotic framework and a distal end mounted to the cable carrier;
   a second leash with a proximal end configured to be mounted to a second arm of the robotic framework and a distal end mounted to the cable carrier below the distal end of the first leash, wherein the first leash and the second leash are each of a predetermined length to restrict lateral movement of the cable carrier; and
   a lower bracket assembly mounted to a distal end of the cable carrier and configured to receive each of the one or more cables that extend beyond a distal end of the robotic framework.

10. The cable management system as recited in claim 9, wherein the proximal end of the cable carrier includes a first mounting bracket for securing the cable carrier to the upper bracket assembly, and the distal end of the cable carrier includes a second mounting bracket for securing the cable carrier to the lower bracket assembly, wherein the first mounting bracket and the second mounting bracket include teeth to which the one or more cables can be anchored.

11. The cable management system as recited in claim 10, wherein the upper bracket assembly includes a mounting ring and a mounting bracket that are configured to be mounted to the robotic framework, with a distal end of the mounting bracket mounted to the first mounting bracket of the cable carrier, and wherein the lower bracket assembly includes a first plate mounted to the second mounting bracket of the cable carrier and a second plate mounted to the first plate.

12. The cable management system as recited in claim 11, wherein the lower bracket assembly further includes one or more fittings mounted to each of the first plate and the second plate, each fitting of the one or more fittings configured to receive one of the one or more cables extending to the end effector of the robot singulator.

13. The cable management system as recited in claim 12, wherein the first plate and the second plate define a cavity for receiving a portion of the robotic framework.

14. The cable management system as recited in claim 9, wherein the cable carrier defines a plurality of interior cavities for receiving the one or more cables and one or more longitudinal channels through which the one or more cables can be inserted into or removed from the cable carrier.

15. The cable management system according to claim 9, wherein the first leash and the second leash are constructed of a semi-elastic and semi-flexible material.

16. A robot singulator, comprising:
    a robotic framework;
    an end effector for engaging parcels mounted to a distal end of the robotic framework;
    one or more cables operably connected to at least one of the robotic framework and the end effector; and
    a cable management system, including
        an upper bracket assembly for mounting the cable management system to the robotic framework,
        a cable carrier mounted to the upper bracket assembly and configured to receive and hold the one or more cables in a grouped configuration, and
        one or more leashes of a predetermined length for restricting lateral movement of the cable carrier, with each leash of the one or more leashes including a distal end that is mounted to the cable carrier and a proximal end that is mounted to the robotic framework.

17. The robot singulator as recited in claim 16, and further comprising:
    a lower bracket assembly mounted to a distal end of the cable carrier and configured to receive each one of the one or more cables that extend beyond a distal end of the robotic framework.

18. The robot singulator as recited in claim 17, wherein the lower bracket assembly includes:
    a first plate mounted to the distal end of the cable carrier;
    a second plate mounted to the first plate; and
    one or more fittings mounted to each of the first plate and the second plate, each fitting of the one or more fittings configured to receive one of the one or more cables extending to the end effector.

19. The robot singulator as recited in claim 16, wherein the one or more leashes includes:
    a first leash with a proximal end mounted to a first arm of the robotic framework and a distal end mounted to the cable carrier; and
    a second leash with a proximal end mounted to a second arm of the robotic framework and a distal end mounted to the cable carrier;
    wherein the first arm of the robotic framework and the second arm of the robotic framework are spaced apart from each other by at least 120°.

20. The robot singulator as recited in claim 16, wherein the cable carrier extends at least half of a length between a base of the robotic framework and a distal end of the robotic framework.

\* \* \* \* \*